(12) United States Patent
Malmborg

(10) Patent No.: US 11,014,190 B2
(45) Date of Patent: May 25, 2021

(54) HOLLOW AIRFOIL WITH CATENARY PROFILES

(71) Applicant: United Technologies Corporation, Farmington, CT (US)

(72) Inventor: Eric W. Malmborg, Amston, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 94 days.

(21) Appl. No.: 16/242,317

(22) Filed: Jan. 8, 2019

(65) Prior Publication Data
US 2020/0215642 A1    Jul. 9, 2020

(51) Int. Cl.
| | | |
|---|---|---|
| *B23K 20/02* | (2006.01) | |
| *B21D 11/14* | (2006.01) | |
| *F01D 5/18* | (2006.01) | |
| *B23K 20/00* | (2006.01) | |

(52) U.S. Cl.
CPC ............ *B23K 20/023* (2013.01); *B21D 11/14* (2013.01); *F01D 5/18* (2013.01); *B23K 20/002* (2013.01); *Y10T 29/49336* (2015.01); *Y10T 29/49339* (2015.01)

(58) Field of Classification Search
CPC ............. B23K 20/023; Y10T 29/49316; Y10T 29/4932; Y10T 29/49336; Y10T 29/49339; Y10T 29/49341
See application file for complete search history.

(56) References Cited

U.S. PATENT DOCUMENTS

| | | | |
|---|---|---|---|
| 4,188,811 A | | 2/1980 | Brimm |
| 4,882,823 A | * | 11/1989 | Weisert ............... B21D 26/055 29/6.1 |
| 5,063,662 A | | 11/1991 | Porter et al. |
| 5,099,573 A | * | 3/1992 | Krauss ................ B21D 26/055 228/157 |
| 5,269,058 A | | 12/1993 | Wiggs et al. |
| 5,285,573 A | * | 2/1994 | LeMonds ............ B21D 26/055 29/463 |
| 5,469,618 A | * | 11/1995 | LeMonds ............ B21D 26/055 29/463 |
| 5,933,951 A | * | 8/1999 | Bergue .................. B21D 22/20 29/889.7 |
| 7,189,064 B2 | * | 3/2007 | Helder ................ B23K 20/122 416/232 |
| 7,237,709 B2 | | 7/2007 | Beckford |

(Continued)

FOREIGN PATENT DOCUMENTS

GB            2073631          10/1981

*Primary Examiner* — Jason L Vaughan
*Assistant Examiner* — Amanda Kreiling
(74) *Attorney, Agent, or Firm* — Carlson, Gaskey & Olds, P.C.

(57) ABSTRACT

A method of forming a gas turbine engine according to an example of the present disclosure includes, among other things, attaching a first skin to a main body to enclose at least one internal channel, the first skin and the main body cooperating to define pressure and suction sides of an airfoil, holding the first skin and the main body between first and second dies, and pressurizing the at least one internal channel such that walls of the first skin and the main body move outwardly toward surface contours of the first and second dies. A gas turbine engine component is also disclosed.

21 Claims, 6 Drawing Sheets

(56) References Cited

U.S. PATENT DOCUMENTS

| | | |
|---|---|---|
| 7,322,223 B2 | 1/2008 | Levers |
| 7,993,105 B2 | 8/2011 | Weisse et al. |
| 8,205,476 B2 | 6/2012 | Voice |
| 8,256,118 B2 | 9/2012 | Cammer |
| 9,010,166 B2 | 4/2015 | Brennand |
| 9,790,800 B2 | 10/2017 | Quigley |
| 2018/0318966 A1 | 11/2018 | Evans et al. |

\* cited by examiner

HOLLOW AIRFOIL WITH CATENARY PROFILES

BACKGROUND

This disclosure relates to a gas turbine engine, and more particularly to forming a hollow gas turbine engine components including airfoils.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fan arrangements include hollow fan blades made of a metallic or composite material. Various techniques can be utilized to construct hollow fan blades, including attaching a cover skin to an airfoil body.

SUMMARY

A method of forming a gas turbine engine according to an example of the present disclosure includes attaching a first skin to a main body to enclose at least one internal channel, the first skin and the main body cooperating to define pressure and suction sides of an airfoil, holding the first skin and the main body between first and second dies, and pressurizing the at least one internal channel such that walls of the first skin and the main body move outwardly toward surface contours of the first and second dies.

In a further embodiment of any of the foregoing embodiments, the airfoil is a fan blade.

In a further embodiment of any of the foregoing embodiments, the at least one internal channel is a plurality of internal channels, and the method further includes forming the plurality of internal channels in the main body.

In a further embodiment of any of the foregoing embodiments, the walls of the first skin have a substantially constant thickness along the plurality of internal channels subsequent to the attaching step.

A further embodiment of any of the foregoing embodiments includes removing material from the walls along exterior surfaces of the pressure and suction sides.

In a further embodiment of any of the foregoing embodiments, the first skin and main body comprise titanium.

In a further embodiment of any of the foregoing embodiments, internal surfaces along the walls bounding the plurality of internal channels have a catenary profile.

In a further embodiment of any of the foregoing embodiments, the attaching step includes brazing, diffusion bonding or welding the first skin to the main body.

In a further embodiment of any of the foregoing embodiments, the pressurizing step includes communicating heat from the first and second dies to the first skin and the main body.

In a further embodiment of any of the foregoing embodiments, the attaching step includes trapping an inert gas in the at least one internal channel In a further embodiment of any of the foregoing embodiments, the inert gas comprises argon.

In a further embodiment of any of the foregoing embodiments, the attaching step includes brazing, diffusion bonding or welding the first skin to the main body.

In a further embodiment of any of the foregoing embodiments, the pressurizing step includes causing the first skin the main body to complement respective ones of the surface contours, each of the surface contours including a plurality of pockets between a plurality of ridges.

In a further embodiment of any of the foregoing embodiments, the holding step includes the plurality of ridges abutting against the walls.

A method of forming an airfoil for a gas turbine engine according to an example of the present disclosure includes providing an airfoil section extending between a leading edge and a trailing edge in a chordwise direction and extending between a tip and a root section in a spanwise direction, the airfoil section defining a suction side and a pressure side separated in a thickness direction, and the airfoil section has one or more ribs that define a plurality of internal channels, deforming walls of the airfoil section, including pressurizing the plurality of internal channels such that the walls move outwardly to define a plurality of bulged portions, and removing material from the plurality of bulged portions along external surfaces of the pressure and suction sides.

In a further embodiment of any of the foregoing embodiments, the walls of the airfoil section corresponding to the plurality of bulged portions have a substantially constant thickness along the plurality of internal channels subsequent to the deforming step.

In a further embodiment of any of the foregoing embodiments, the removing step includes establishing a continuous surface contour along each of the respective pressure and suction sides that extends from the leading edge to the trailing edge.

In a further embodiment of any of the foregoing embodiments, the airfoil section includes a first skin and a main body that cooperate to define the pressure and suction sides, and the method further includes attaching the first skin to the main body to enclose the plurality of internal channels, including trapping an inert gas in the plurality of internal channel.

In a further embodiment of any of the foregoing embodiments, the deforming step includes heating the inert gas to cause the walls to complement surface contours defined by first and second dies, the surface contours including a plurality of pockets.

In a further embodiment of any of the foregoing embodiments, the walls defining the plurality of internal channels have a thickness that tapers in the chordwise direction between adjacent pairs of the ribs for at least a majority of a distance between the adjacent pairs of the ribs subsequent to the removal step.

The various features and advantages of this disclosure will become apparent to those skilled in the art from the following detailed description. The drawings that accompany the detailed description can be briefly described as follows.

DETAILED DESCRIPTION

Figure 1:
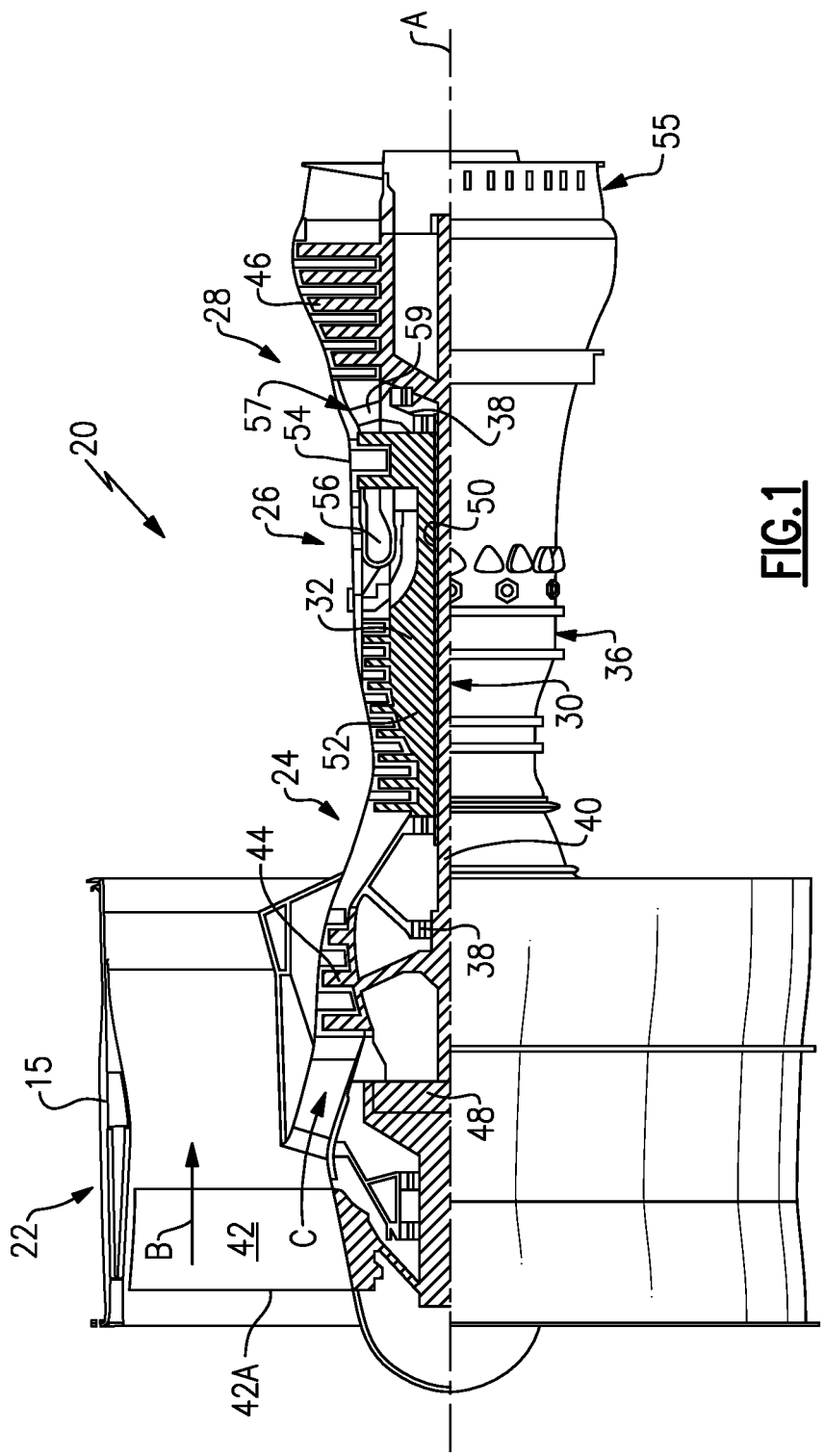
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
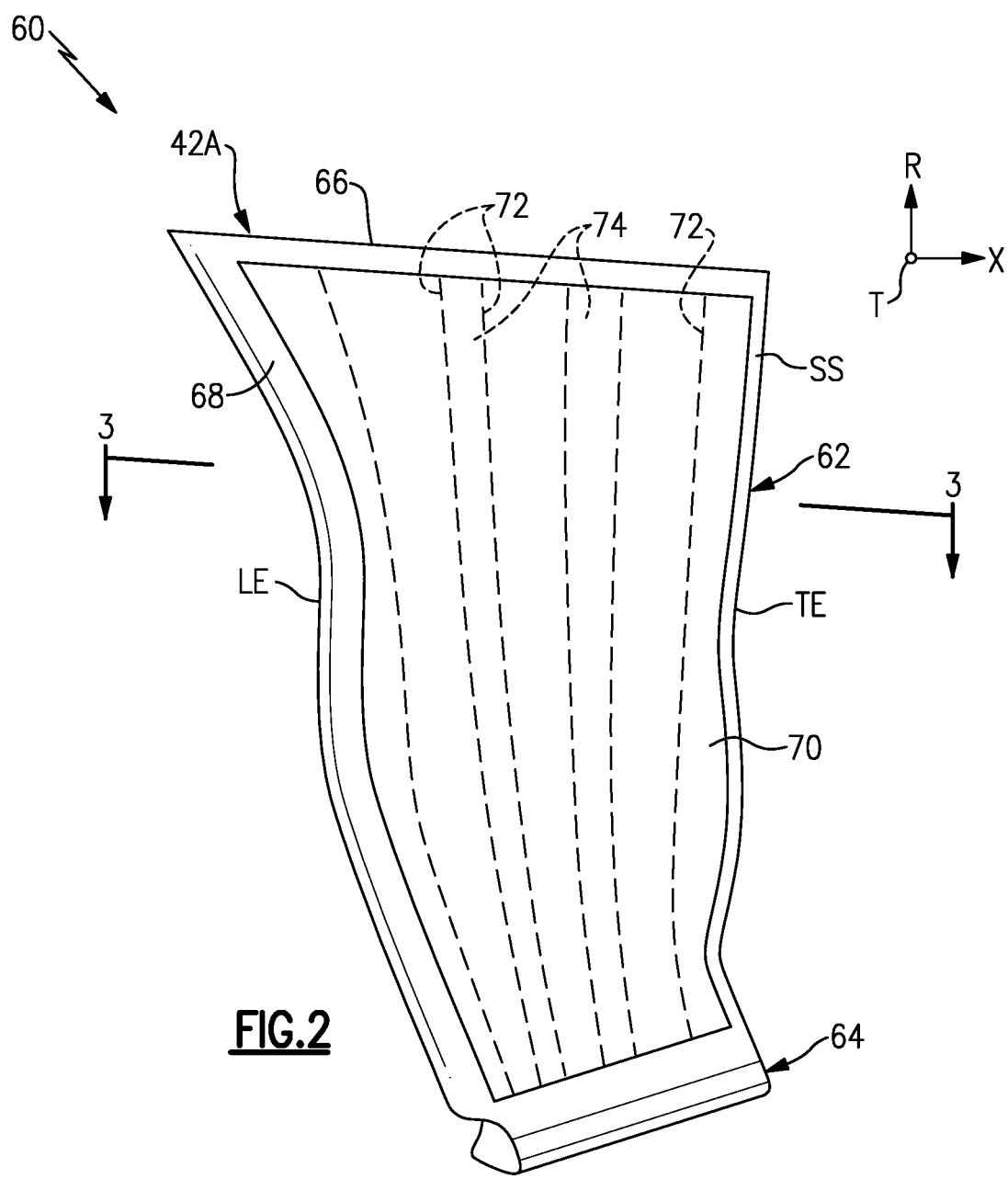
FIG. 2 illustrates a perspective view of an airfoil.

FIG. 2 illustrates a gas turbine engine component 60 according to an example. The component 60 can be incorporated in the gas turbine engine 20 of FIG. 1, for example. In the illustrated example of FIG. 2, the component 60 is an airfoil or fan blade 42A for the fan 42 of FIG. 1. Other types of airfoils, including blades and vanes in the fan, compressor and turbine sections 22, 24, 28, mid-turbine frame 57 and turbine exhaust case (TEC) 55 (FIG. 1), such as inlet and exit guide vanes, struts, may benefit from the examples disclosed herein which are not limited to the design shown. Other parts of the gas turbine engine 20 may benefit from the examples disclosed herein, including industrial turbines.

Figure 3:
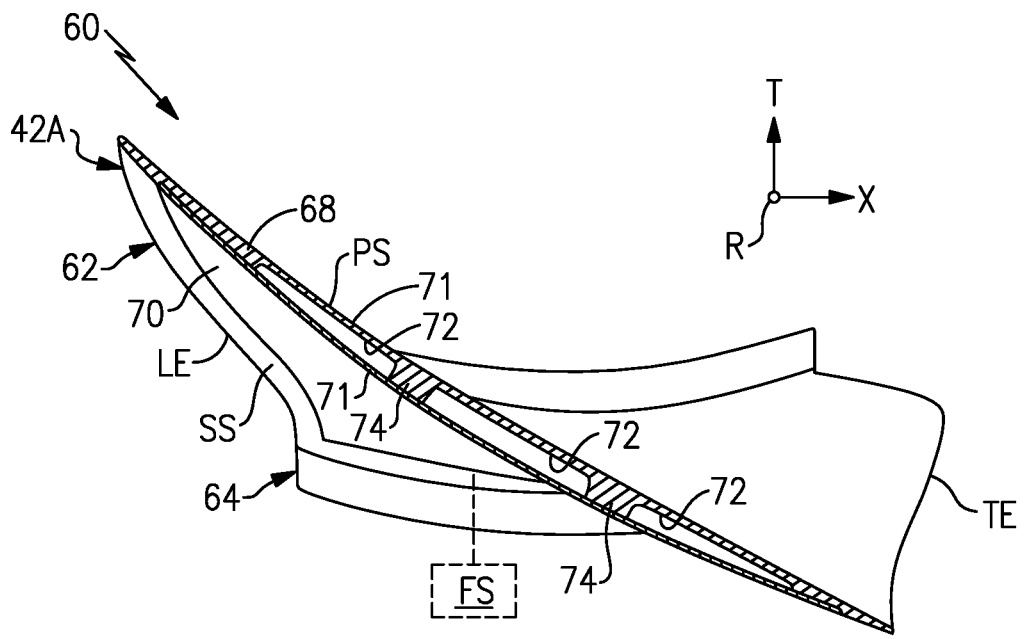
FIG. 3 illustrates a sectional view of the airfoil taken along line 3-3 of FIG. 2.

The fan blade 42A includes an airfoil section 62 extending in a spanwise or radial direction R from a root section 64. The root section 64 is a shape that is configured to mount the fan blade 42A in the engine 20, such as a dovetail shape. Generally, one side of the airfoil section 62 is a suction side SS and the other side is a pressure side PS (shown in FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour of the airfoil section 62, as illustrated in FIG. 3.

The airfoil section 62 includes a first skin or main body 68 that extends in the radial direction R between the root section 64 and a tip 66. The tip 66 is a terminal end of the fan blade 42A. The main body 68 extends in a chordwise direction X between a leading edge LE and a trailing edge TE. The main body 68 defines at least one of the pressure and suction sides PS, SS. In the illustrated example of FIGS. 2 and 3, the main body 68 defines both the pressure and suction sides PS, SS.

The fan blade 42A includes a cover (or second) skin 70 disposed on a surface of the main body 68. In the illustrated example of FIGS. 2 and 3, the cover skin 70 is arranged to provide a continuous surface with the suction side SS of the fan blade 42A. In another example, the cover skin 70 is disposed on the pressure side PS of the fan blade 42A. The component 60 can include two or more cover skins along each of the pressure and/or suction sides PS, SS of the airfoil section 62.

The main body 68 and cover skin 70 can be made out of metallic materials such as titanium or aluminum. Other materials for the main body 68 and cover skin 70 can be utilized, including alloys.

Referring to FIG. 3 with continuing reference to FIG. 2, the component 60 includes at least one internal channel 72 defined in the airfoil section 62 (shown in dashed lines in FIG. 2 for illustrative purposes). In the illustrative example of FIG. 3, the main body 68 includes one or more ribs 74 that define a plurality of internal channels 72. Each internal channel 72 is elongated and has a major component that extends in the radial direction R at least partially or completely between the root section 64 and the tip 66. The component 160 can include fewer or more than three internal channels 72, such as only one internal channel 72. Each internal channel 72 can be defined having different dimensions, shapes and at other orientations than illustrated by FIG. 3.

Walls 71 of the component 60 bound the internal channels 72. The walls 71 can be internal or external walls of the component 60. In the illustrated example of FIG. 3, the main body 68 and cover skin 70 define one or more of the walls 71. The cover skin 70 is attached to the main body 68 to enclose or otherwise bound the internal channels 72, with the main body 68 and cover skin 70 cooperating to define the pressure and suction sides PS, SS of the airfoil section 62.

Figure 4:
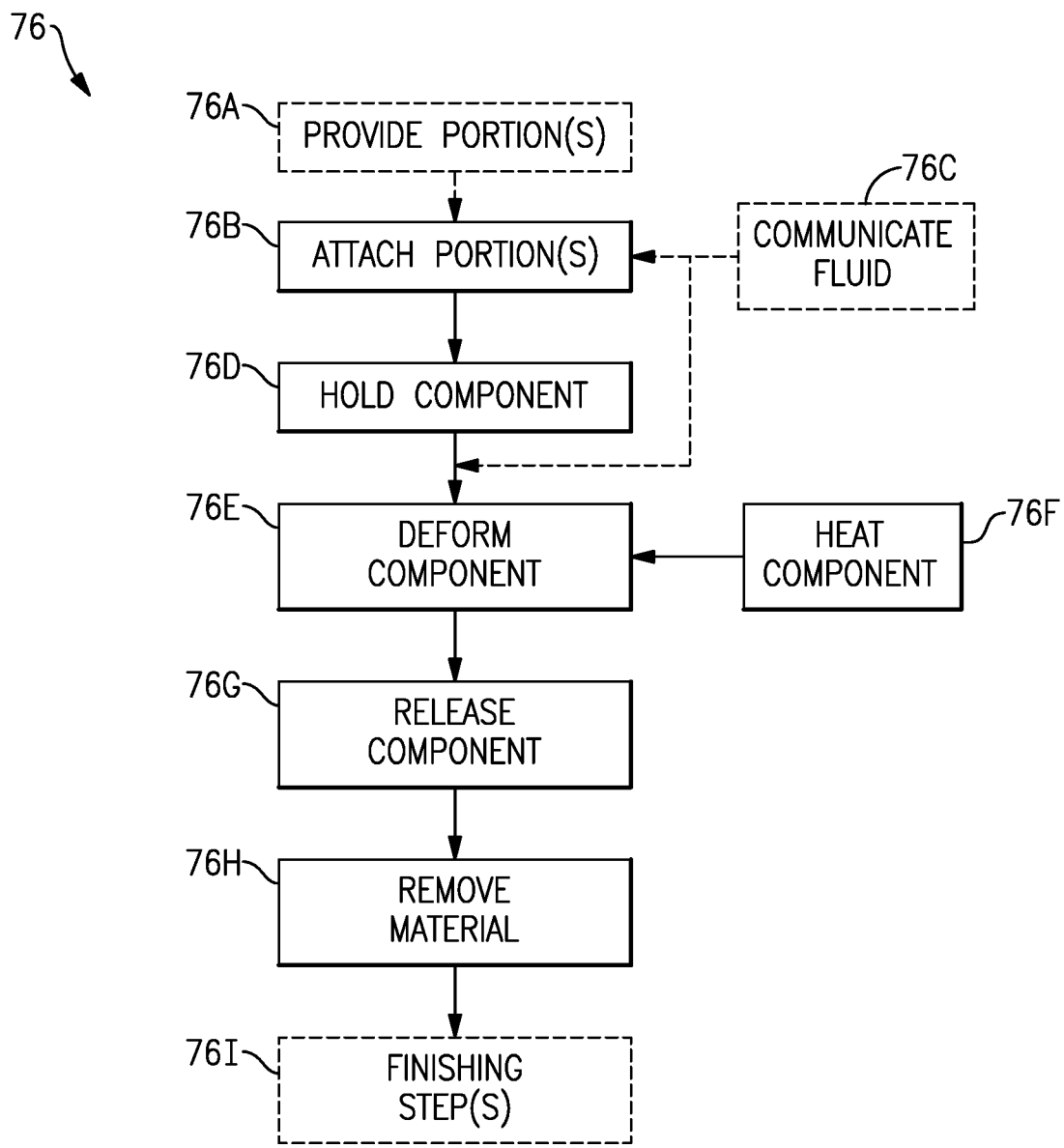
FIG. 4 illustrates a process for forming a gas turbine engine component.

FIG. 4 illustrates a process of constructing or forming a gas turbine engine component in a flow chart 76. The process can be utilized to form the component 60 of FIGS. 2 and 3, such as fan blade 42A or another hollow airfoil, for example. In this disclosure, like reference numerals designate like elements where appropriate and reference numerals with the addition of one-hundred or multiples thereof designate modified elements that are understood to incorporate the same features and benefits of the corresponding original elements. Reference is made to component 160 of FIGS. 5-9 for illustrative purposes, which disclose exemplary conditions or states of the component 160 in the process 76. In the illustrative example of FIGS. 5-9, the component 160 is a hollow airfoil or fan blade including an airfoil section 162. The techniques disclosed herein can be utilized to form a new component or to repair a previously fielded component in a repair process.

Figure 5:
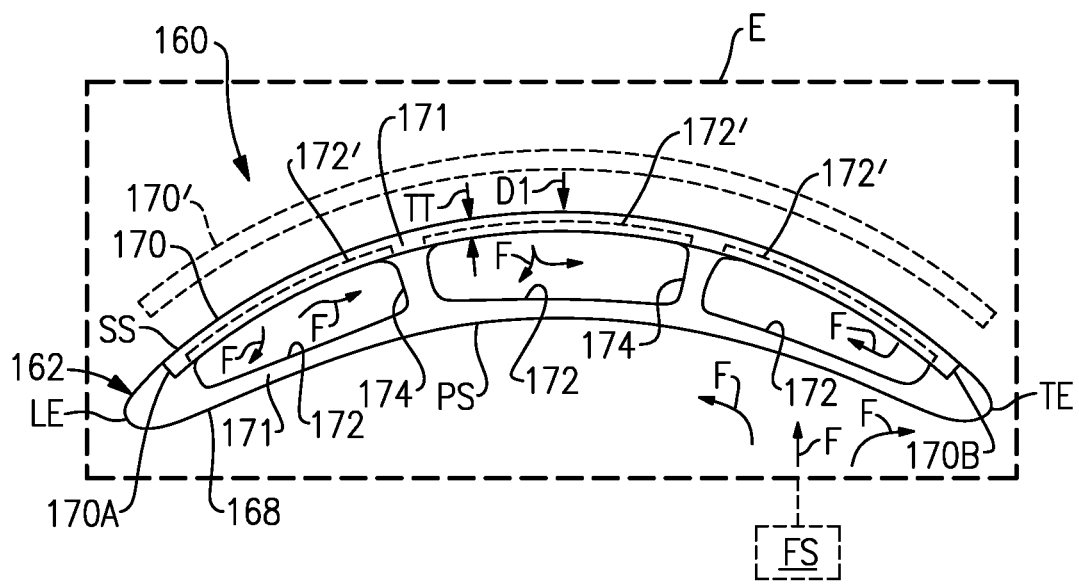
FIG. 5 illustrates attachment of portions of the component.

Referring to FIGS. 4 and 5, one or more portions of the component 160 are prepared or otherwise provided at step 76A. The component 160 includes a first skin or main body 168 and a cover (or second) skin 170 that define one or more walls 171 of the component 160. Cover skin 170' is shown in dashed lines at a distance away from the main body 168 for illustrative purposes. One or more internal channels 172 are formed in the main body 168 and/or the cover skin 170 (internal channels 172' defined in cover skin 170 shown in dashed lines for illustrative purposes).

Various techniques can be utilized to form the internal channels 172, including casting, machining or additive manufacturing techniques. The cover skin 170' is moved in a direction D1 and brought into abutment with ribs 174 of the main body 168 to define a pre-finished state of the airfoil section 162.

At step 76B, the cover skin 170 is attached to the main body 168 to enclose or otherwise bound internal channels 172. In examples, a perimeter of the cover skin 170 and locations of the cover skin 170 abutting the ribs 174 are attached to the main body 168. Various techniques can be utilized to attach the cover skin 170, including welding, diffusion bonding, or brazing.

The component 160 can be situated in a controlled environment E (shown in dashed lines) prior to and during the step 76B. At step 76C, a fluid source FS (shown in dashed lines) is operable to supply or otherwise communicate an amount of fluid F to the environment E. Example fluids F include inert gases such as argon or helium. The fluid F circulates in the environment E and is communicated to the internal channels 172. Attaching the cover skin 170 to the main body 168 can cause an amount of the fluid F to be trapped in the internal channels 172. In other examples, fluid F is communicated to the internal channels via passages in the root section (see, e.g., root section 64, channels 72 and fluid source FS of FIG. 3).

Cover skin 170 can be a thin sheet stock of metal having a substantially uniform or constant thickness between opposed ends 170A, 170B, which can reduce complexity in pre-fabricating the cover skin 170. The cover skin 170 is dimensioned such that substantially each portion or at least a majority of walls of the cover skin 170 have a thickness TT that is substantially constant along the internal channels 172 prior and subsequent to the attaching step 76B.

Figure 6:
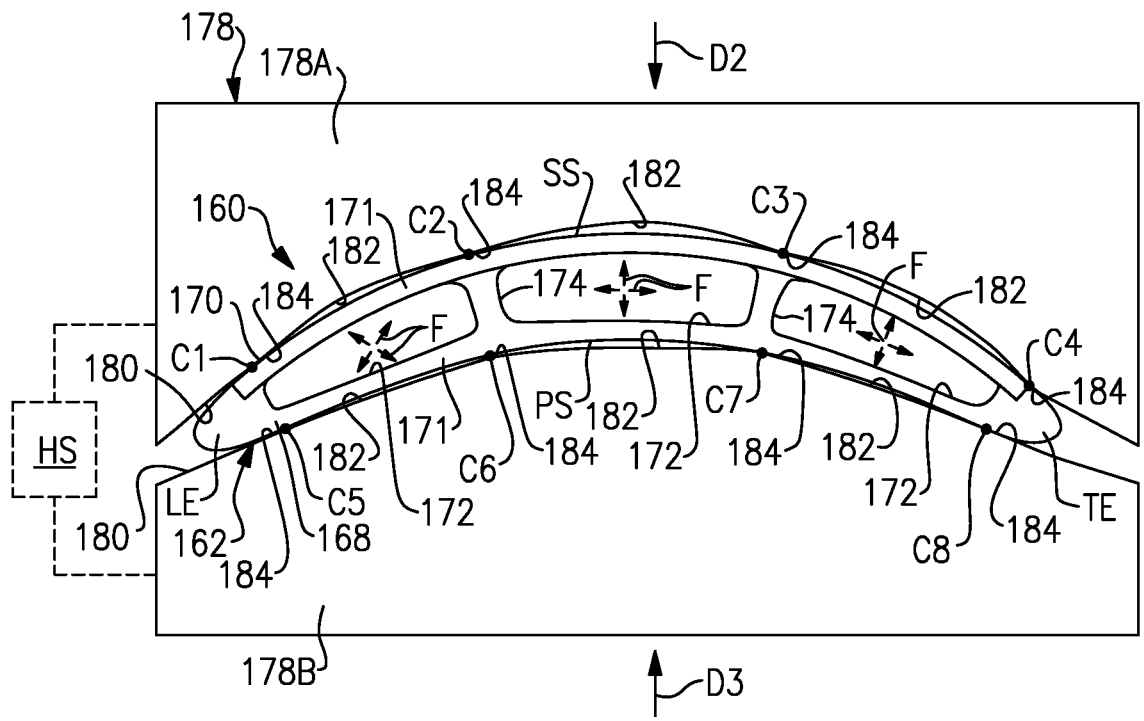
FIG. 6 illustrates the component of FIG. 5 positioned between two dies.

Referring to FIGS. 4 and 6, the component 160 is positioned between a set of dies 178 including first and second dies (or die halves) 178A, 178B. Each of the dies 178A, 178B defines a respective die profile or surface contour 180. Each of the surface contours 180 includes a plurality of pockets 182 between a plurality of ridges 184. The surface contours 180 can include a quantity of pockets 182 that is equal to a quantity of the internal channels 172, such as three pockets 182 defining each respective surface contour 180. The component 160 can include fewer or more than three internal channels 172, such as one or two internal channels 172. The pockets 182 are concave, relatively shallow and establish a set of gaps between the walls 171 of the component 160 and the dies 178A, 178B.

At step 76D, the dies 178A, 178B are moved in opposed directions D2, D3 and brought into abutment against the component 160 to hold the main body 168 and cover skin 170 between the dies 178A, 178B. The ridges 184 of the respective dies 178A, 178B are brought into abutment or chordwise contact the walls 171 of the component 160 at a plurality of contact points C1-C8. Contact points C1, C4-C5 and C8 are established adjacent to the leading and trailing edges LE, TE of the airfoil section 162. Contact points C2-C3 and C6-C7 are established along the pressure and suction sides PS, SS, respectively, with ribs 174 between opposed sets of the contact points C2/C6 and C3/C7. It should be understood that fewer or more than eight contact points can be established to hold the component 160 between the dies 178A, 178B. The component 160 can be tightly held along the contact points C1-C8.

The dies 178A, 178B serve as "gas sizing" dies that are utilized to cause at least a portion of the component 160 to undergo creep deformation. Creep deformation and gas sizing are generally known. However, utilization of creep deformation and gas sizing techniques to form the components 60, 160 disclosed herein are not known.

At step 76E, the component 160 undergoes permanent deformation to vary a geometry of the walls 171 of the main body 168 and/or cover skin 170. The internal channels 172 are pressurized with the fluid F at a predefined pressure threshold for a predefined period of time. Pressurizing the fluid F in the internal channels 172 can include communicating heat from the dies 178A, 178B to the main body 168 and cover skin 170 to heat or otherwise excite the fluid F (e.g., inert gas) in the internal channels 172 at step 76F. The dies 178A, 178B can be heated to a predefined temperature threshold for at least a portion of the period of time utilizing a heating source HS (shown in dashed lines in FIG. 6). The heating source HS can include a resistance heating assembly that communicates electrical current to resistive heating elements integrated in or contacting the dies 178A, 178B, for example.

Figure 7:
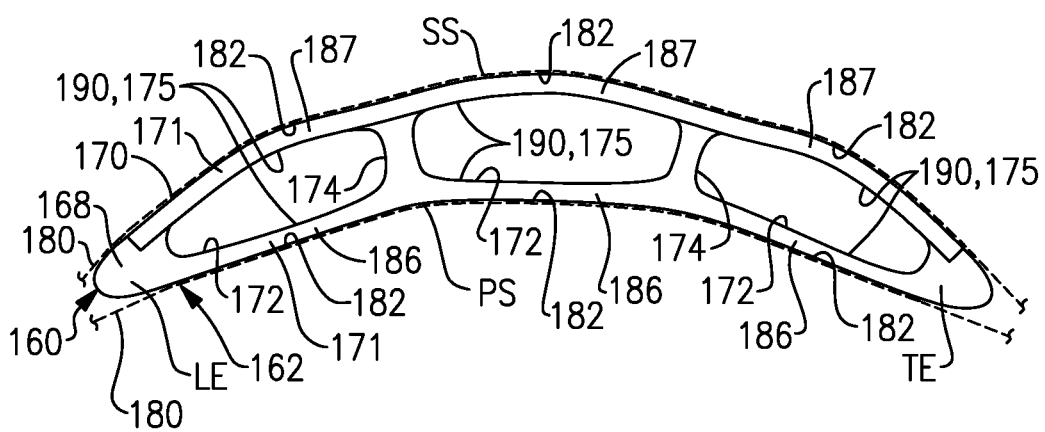
FIG. 7 illustrates deformation of the component of FIG. 6.

Pressurizing the internal channels 172 while heating the component 160 to an elevated temperature for the period of time imposes stresses on the component 160 and causes the walls 171 of the main body 168 and cover skin 170 to permanently deform. The period of time can be set to minimize or otherwise reduce the residual stresses and allow the walls 171 to conform to the profile of the surface contours 180. The permanent deformation includes the walls 171 bulging outward or otherwise moving outwardly toward the surface contours 180 of the first and second dies 178A, 178B to define a plurality of bulged portions 186, 187, as illustrated by FIG. 7 (with the surface contours 180 shown in dashed lines for illustrative purposes). One would understand how to determine a specific time and temperature profile for the respective component in view of the teachings disclosed herein.

Figure 8:
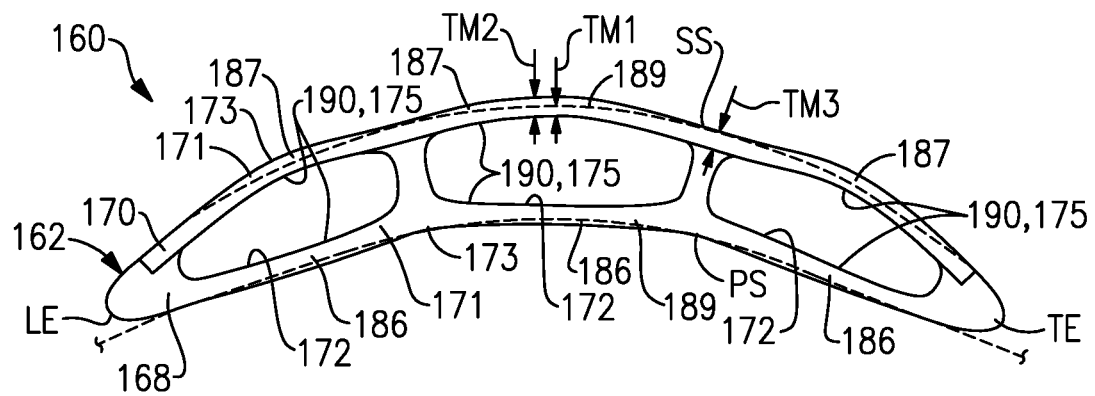
FIG. 8 illustrates removal of material from the component of FIG. 7.

Permanent deformation of the walls 171 of the airfoil section 162 causes the main body 168 and cover skin 170 to complement respective ones of the surface contours 180, with the walls 171 having one or more undulations along the pressure and suction sides PS, SS. The undulations are defined by the bulged portions 186, 187, which can have a generally planar or convex profile. The walls 171 corresponding to the bulged portions 186, 187 have a substantially constant thickness along the internal channels 172 subsequent to the deformation at step 76E, as illustrated by FIGS. 7 and 8. At step 76G, the component 160 is released and removed from the dies 178A, 178B.

Referring to FIGS. 4 and 8, at step 76H excess material is removed from the walls 171 of the component 160 along external surfaces 173 of the pressure and/or suction sides PS, SS defined by the bulged portions 186 and/or 187. Various techniques can be utilized to remove material, such as a machining operation, or polishing.

Material is removed such that a first minimum thickness TM1 along the wall 171 bounding the respective internal channel 172 subsequent to the removal step 76H is less than a second minimum thickness TM2 along the respective wall 171 bounding the respective internal channel 172 subsequent to the attaching step 76B but prior to the removal step 76H. In examples, a ratio of TM1:TM2 is less than 90% (i.e., 10% reduction in TM2), or more narrowly between 50% and 75%, for at least some or each and every one of the respective walls 171 along the internal channels 172. For example, a thickness TM3 may be reduced by at least 10% adjacent the ribs 174, and the thickness TM2 may be reduced by about 50% along a midpoint located along internal surface 175 between opposed ends of the internal channel 172.

Excess material is removed to establish external surface contours 188, 189 along each of the respective pressure and suction sides PS, SS (also shown in dashed lines in FIG. 8). The removed material includes material along the undulations defined by respective ones of the bulged portions 186, 187. The surface contours 188, 189 are continuous surface contours that extend from the leading edge LE to the trailing edge TE to define an aerodynamic surface contour or profile of the component 160.

The relatively greater thickness of the walls 171 prior to the removal step 76H can reduce thermal distress during attachment of the cover skin 170 to the main body 168 along the attachment points in which residual stresses will form. The amount of excess material or thickness of the walls 171 can be set with respect to underfill from welding, geometry of the bulged portions 186, 187 and removal operations to define the external surface contours 188, 189.

The removal of material reduces an overall weight of the component 160, and can reduce a complexity of portions defining the component 160 including main body 168 and cover skin 170. Additionally, machining of surfaces of the internal channels 172 subsequent to the attaching step 76B may be omitted. The removal of material can also reduce a likelihood of blade loss imbalance due to liberation of one of the airfoils from the rotor.

Figure 9:
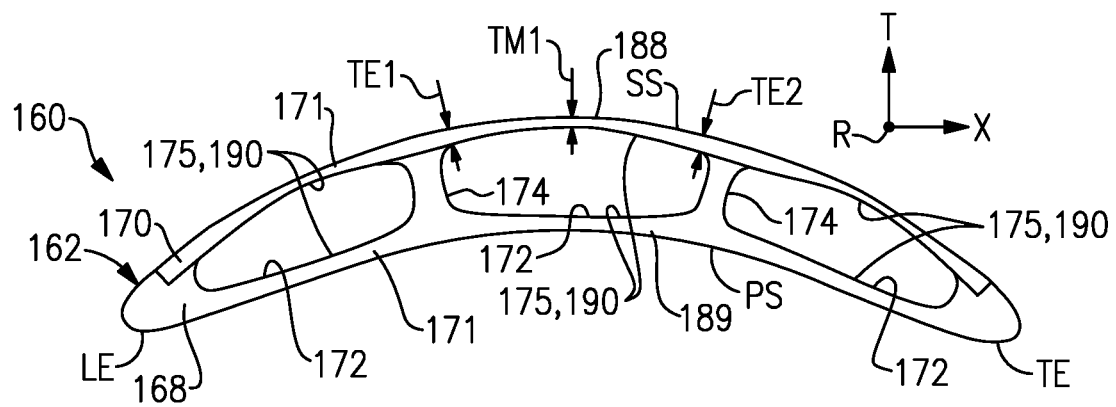
FIG. 9 illustrates the component of FIG. 8 subsequent to material removal.

FIG. 9 illustrates the component 160 subsequent to the removal of material and can correspond to a finished or near-finished component. The external surface contours 188, 189 of the component 160 subsequent to the removal of the material at step 76H. As illustrated in FIG. 9, a thickness of the walls 171 differs along the internal channels 172 due to the removal of the material from the bulged portions 186 and/or 187 (FIG. 8). The walls 171 defining the internal channels 172 have a thickness that tapers in the chordwise direction X between adjacent pairs of the ribs 174 for at least a majority of a distance between the adjacent pairs of the ribs subsequent to the removal of the material. The tapering thickness can reduce an overall weight of the component 160.

Deformation of the component 160 causes internal surfaces 175 along the walls 171 bounding the internal channels 172 to have a substantially catenary profile 190, as illustrated by FIGS. 7-9. In the illustrated examples of FIGS. 7-9, the internal surfaces 175 of each internal channel 172 define first and second catenary profiles 190 opposed to each other and defined along the pressure and suction sides PS, SS of the walls 171. For the purposes of this disclosure, the term "catenary profile" means a U-shaped or arcuate curve that an idealized hanging cord assumes under its own weight when hanging freely from its ends. For the purposes of this disclosure, the term "substantially" means within ±3% of the value unless otherwise stated.

In examples, the minimum thickness TM1 along the catenary profile 190 is less than 95% of a maximum thickness of the wall 171 bounding the respective internal channel 172, or more narrowly between 50% and 75% of the maximum thickness. In the illustrated example of FIG. 9, the maximum thickness is defined adjacent to one of the ribs 174 corresponding to one of the thicknesses TE1, TE2 along the internal surface 175 on opposed ends of the catenary profile 190. The thicknesses TE1, TE2 exclude rounding of the internal surfaces along the ribs 174 towards the walls 171.

One or more finishing steps can be performed at step 761. Step 761 can include applying one or more coatings to the component 160 and performing other machining operations on the walls 171 and/or other portions of the component 160, for example.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of forming a gas turbine engine component comprising:
    attaching a first skin to a main body to enclose at least one internal channel, the first skin and the main body cooperating to define pressure and suction sides of an airfoil;
    holding the first skin and the main body between first and second dies; and
    pressurizing the at least one internal channel such that walls of the first skin and the main body move outwardly toward surface contours of the first and second dies; and
    wherein the pressurizing step includes causing the first skin and the main body to complement respective ones of the surface contours, each of the surface contours including a plurality of pockets between a plurality of ridges.

2. The method as recited in claim 1, wherein the airfoil is a fan blade.

3. The method as recited in claim 1, wherein the at least one internal channel is a plurality of internal channels, and further comprising forming the plurality of internal channels in the main body.

4. The method as recited in claim 3, wherein the walls of the first skin have a substantially constant thickness along the plurality of internal channels subsequent to the attaching step.

5. The method as recited in claim 4, further comprising removing material from the walls along exterior surfaces of the pressure and suction sides.

6. The method as recited in claim 5, wherein the first skin and main body comprise titanium.

7. The method as recited in claim 6, wherein internal surfaces along the walls bounding the plurality of internal channels have a catenary profile.

8. The method as recited in claim 7, wherein:
    the at least one internal channel is a plurality of internal channels spaced apart by a plurality of ribs; and
    the first and second dies are dimensioned such that during the holding step but prior to the pressurizing step the plurality of ridges of the first die abut against the first skin and the plurality of ridges of the second die abut against the main body at respective contact points, all of the plurality of pockets are spaced apart from the first skin and the main body, and each of the ribs is situated between a respective pair of the contact points.

9. The method as recited in claim 1, wherein the attaching step includes brazing, diffusion bonding or welding the first skin to the main body.

10. The method as recited in claim 1, wherein the pressurizing step includes communicating heat from the first and second dies to the first skin and the main body.

11. The method as recited in claim 10, wherein the attaching step includes trapping an inert gas in the at least one internal channel.

12. The method as recited in claim 11, wherein the inert gas comprises argon.

13. The method as recited in claim 10, wherein the attaching step includes brazing, diffusion bonding or welding the first skin to the main body.

14. The method as recited in claim 1, wherein the holding step includes the plurality of ridges abutting against the walls.

15. A method of forming an airfoil for a gas turbine engine comprising:
    providing an airfoil section extending between a leading edge and a trailing edge in a chordwise direction and extending between a tip and a root section in a spanwise direction, the airfoil section defining a suction side and a pressure side separated in a thickness direction, and the airfoil section including one or more ribs defining a plurality of internal channels;
    deforming walls of the airfoil section, including pressurizing the plurality of internal channels such that the walls move outwardly to define a plurality of bulged portions; and
    removing material from the plurality of bulged portions along external surfaces of the pressure and suction sides.

16. The method as recited in claim 15, wherein the walls of the airfoil section corresponding to the plurality of bulged portions have a substantially constant thickness along the plurality of internal channels subsequent to the deforming step.

17. The method as recited in claim 15, wherein the removing step includes establishing a continuous surface contour along each of the respective pressure and suction sides that extends from the leading edge to the trailing edge.

18. The method as recited in claim 15, wherein the airfoil section includes a first skin and a main body that cooperate to define the pressure and suction sides, and further comprising:
    attaching the first skin to the main body to enclose the plurality of internal channels, including trapping an inert gas in the plurality of internal channel.

19. The method as recited in claim 18, wherein the deforming step includes heating the inert gas to cause the walls to complement surface contours defined by first and second dies, the surface contours including a plurality of pockets.

20. The method as recited in claim 19, further comprising:
    holding the walls of the airfoil section between the first and second dies;

wherein the removing step includes establishing a continuous surface contour along each of the respective pressure and suction sides from the leading edge to the trailing edge;

wherein the surface contours includes a plurality of ridges between the plurality of pockets, the pockets dimensioned to receive respective ones of the bulges during the deforming step;

wherein the first and second dies are dimensioned such that during the holding step but prior to the deforming step the plurality of ridges of the first and second dies abut against the walls of the airfoil section at respective contact points, all of the plurality of pockets are spaced apart from the walls of the airfoil section, and each of the one or more ribs is situated between a respective pair of the contact points; and wherein internal surfaces along the walls bounding the plurality of internal channels have a catenary profile.

21. The method as recited in claim 15, wherein the walls defining the plurality of internal channels have a thickness that tapers in the chordwise direction between adjacent pairs of the ribs for at least a majority of a distance between the adjacent pairs of the ribs subsequent to the removal step.

\* \* \* \* \*